(12) United States Patent
Donovan et al.

(10) Patent No.: US 7,501,747 B2
(45) Date of Patent: Mar. 10, 2009

(54) INTEGRATED CIRCUIT OPTICAL SIGNAL EMITTERS

(75) Inventors: Brian T. Donovan, Vancouver, WA (US); William B. Dress, Camas, WA (US)

(73) Assignee: Lightfleet Corporation, Vancouver, WA (US)

( * ) Notice: Subject to any disclaimer, the term of this patent is extended or adjusted under 35 U.S.C. 154(b) by 251 days.

(21) Appl. No.: 10/702,095

(22) Filed: Nov. 5, 2003

(65) Prior Publication Data

US 2004/0150309 A1    Aug. 5, 2004

Related U.S. Application Data

(60) Provisional application No. 60/432,141, filed on Dec. 10, 2002, provisional application No. 60/423,939, filed on Nov. 5, 2002.

(51) Int. Cl.
*H01J 1/50* (2006.01)
*H05B 37/02* (2006.01)

(52) U.S. Cl. .................. 313/161; 315/224; 315/307; 315/209 R

(58) Field of Classification Search ......... 315/224–225, 315/209 R, 244, 219, 291, 307–308, 247; 313/116, 161; 118/723 I
See application file for complete search history.

(56) References Cited

U.S. PATENT DOCUMENTS

| | | | | |
|---|---|---|---|---|
| 3,798,568 | A | * | 3/1974 | Willett ..................... 372/82 |
| 4,211,834 | A | * | 7/1980 | Lapadula et al. ............ 430/326 |
| 4,230,902 | A | * | 10/1980 | Hug et al. ................... 178/15 |
| 4,388,720 | A | * | 6/1983 | Silfvast et al. ................ 372/76 |
| 4,600,299 | A | * | 7/1986 | Abshire .................... 356/5.15 |
| 6,683,418 | B2 | * | 1/2004 | Shoji et al. .................. 315/224 |
| 2003/0210409 | A1 | * | 11/2003 | Huang et al. ................. 358/1.1 |

OTHER PUBLICATIONS

PCT Search Report mailed on May 13, 2004 corresponding to PCT Application No. US03/35242.
McCormick et al., "Five-Stage Free-Space Optical Switching Network With Field-Effect Transistor Self-Electro-Optic-Effect-Device Smart-Pixel Arrays," Mar. 10, 1994, pp. 1601-1618, Applied Optics.
Cloonan, et al., "Shuffle-Equivalent Interconnection Topologies Based On Computer-Generated Binary-Phase Gratings," Mar. 10, 1994, pp. 1405-1430, Applied Optics.

* cited by examiner

*Primary Examiner*—Nimeshkumar D. Patel
*Assistant Examiner*—Anne M Hines
(74) *Attorney, Agent, or Firm*—John Bruckner PC

(57) ABSTRACT

Methods and apparatus are described for integrated circuit optical signal emitters. A method includes emitting an optical signal from a gas plasma that is RF inductively coupled to an integrated circuit including a gas plasma discharge device having an inductive coil. Emitting includes magnetically energizing the inductive coil with the integrated circuit to induce a discharge from the gas plasma.

8 Claims, 4 Drawing Sheets

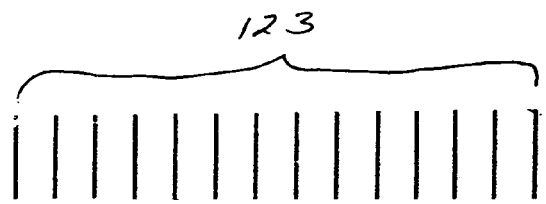
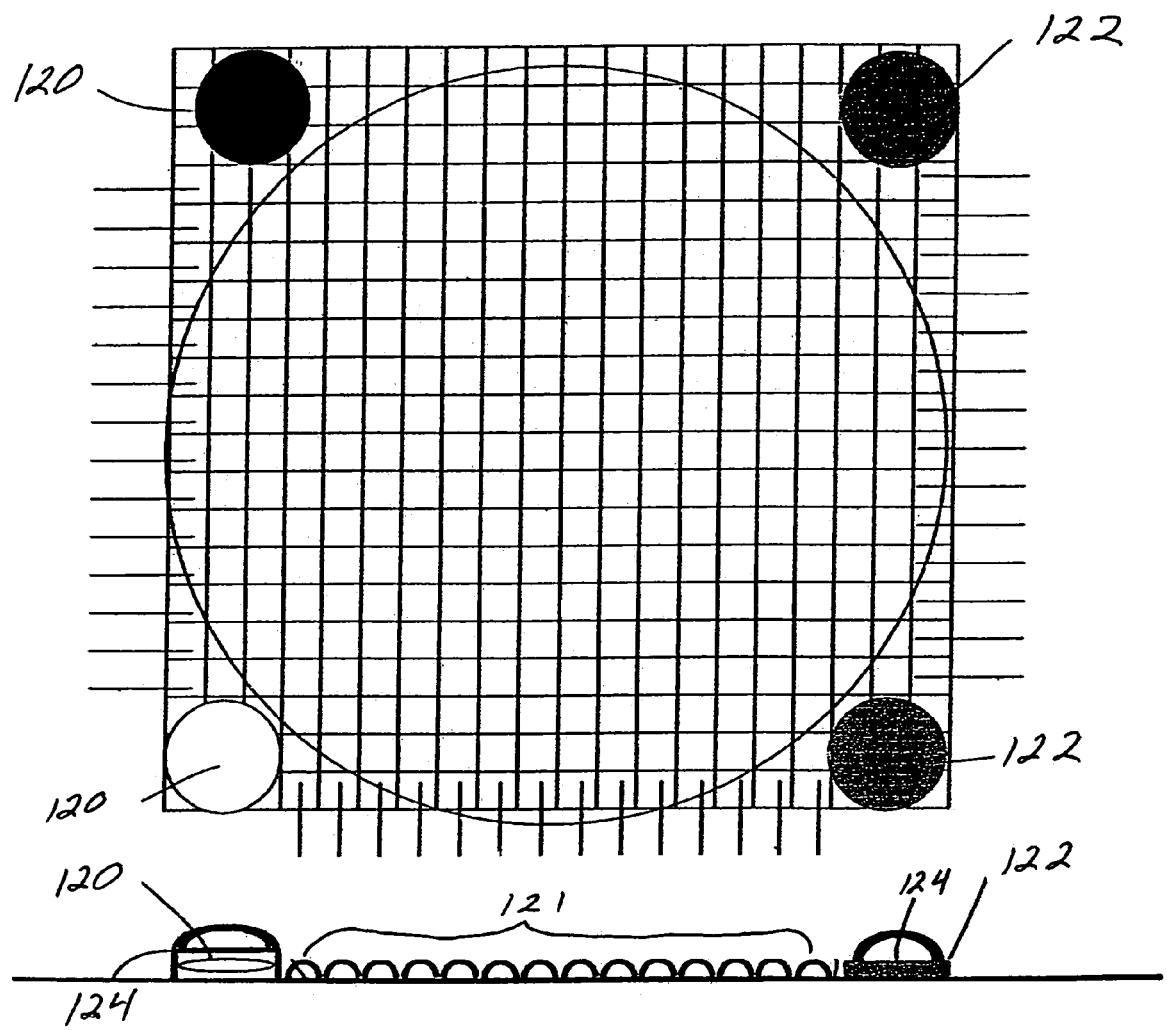

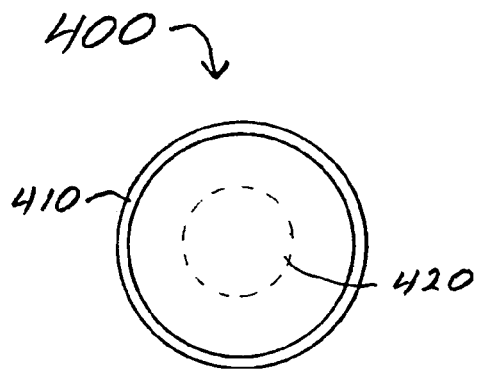
Fig 4A
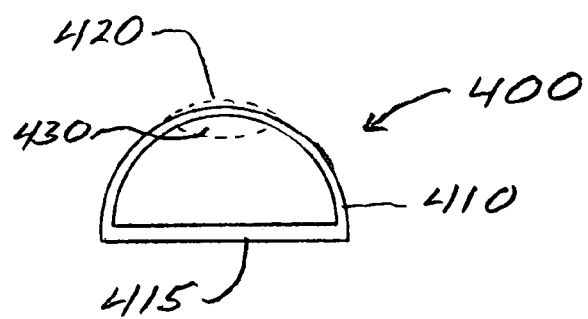
Fig 4B
Fig 5
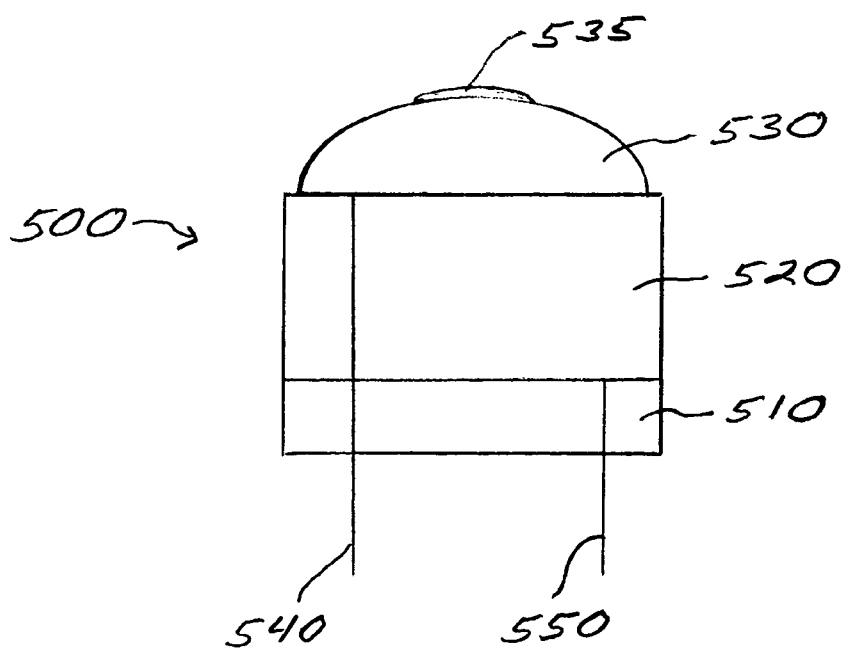

Fig 6A
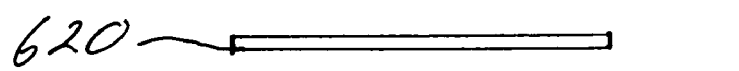
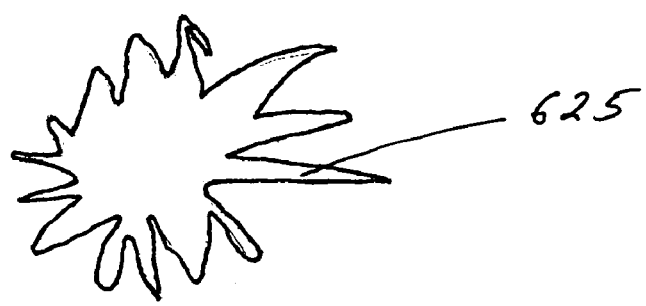
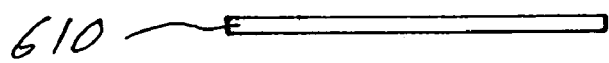
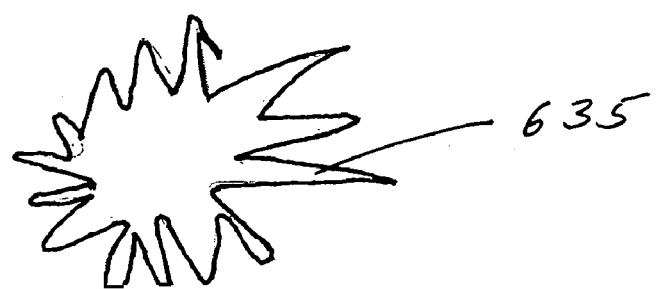
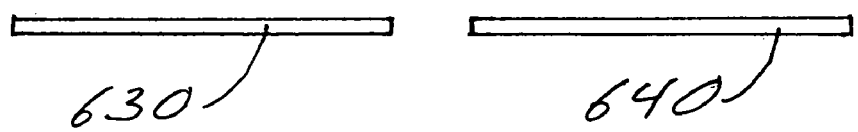
Fig 6B

INTEGRATED CIRCUIT OPTICAL SIGNAL EMITTERS

CROSS REFERENCES TO RELATED APPLICATIONS

This application claims a benefit of priority under 35 U.S.C. 119(e) from both copending provisional patent application U.S. Ser. No. 60/423,939, filed Nov. 5, 2002 and copending provisional patent application U.S. Ser. No. 60/432,141, filed Dec. 10, 2002, the entire contents of both of which are hereby expressly incorporated herein by reference for all purposes.

BACKGROUND OF THE INVENTION

1. Field of the Invention

The invention relates generally to the field of optical signal emitters. More particularly, the invention relates to integrated circuit gas discharge light emitters as well as integrated circuits that include an acousto-optic crystal together with a light emitting diode or laser diode and/or a lens.

2. Discussion of the Related Art

Hot electron sources are well known to those skilled in the art of photonics. A hot electron source can be used as a source of emitted photons, via phosphors for example, or directly. Integrated circuits that include a hot electron source are conventional.

Light emitting diodes, sometimes called LEDs, are also well-known to those skilled in the art of photonics. Integrated circuits that include a light emitting diode are conventional.

Lasers, are also well-known to those skilled in the art of photonics. Integrated circuits that include a laser are also conventional.

However, it is important to appreciate that none of the known hot electron source, LED or laser approaches provide an efficient, inexpensive, fast switching light emission source for use as part of an integrated circuit. Hot electron sources are very inefficient, typically providing a conversion efficiency of less than 0.01% electrical to optical. Silicon based light emitting diodes and lasers are not fast switching relative to current demand for data throughput. GaAs and InP and other more expensive integrated circuit processes do make some reasonably fast switching LED and laser devices available, but such devices are currently at least 10 times more expensive than silicon based devices. Another problem with these more expensive process based LED and laser devices is that they also have a limited range of emission wavelengths available. What is needed, therefore, is a integrated circuit light emission source that is energy efficient, inexpensive, fast switching and wavelength versatile.

Meanwhile, gases containing electrically charge particles, sometime called plasmas, are well-known to those skilled in the art of video displays. Plasmas can be generated by applying a radio frequency (RF) potential across a gas in a partially evacuated chamber. For instance, a conventional plasma video display typically includes thousands of individually addressable pixels each of which can be defined by a plasma containing cell. Also, those of skill in the art of microelectronic fabrication are familiar with the use of plasmas to deposit materials on substrates and/or remove materials from substrates.

Heretofore, the requirements of efficiency, low cost, quick switching and emission wavelength flexibility in an integrated circuit light emitter referred to above have not been fully met. What is needed is a solution that simultaneously satisfies all of these requirements.

SUMMARY OF THE INVENTION

There is a need for the following aspects of the invention. Of course, the invention is not limited to these aspects.

According to an aspect of the invention, a process comprises: emitting an optical signal from a gas plasma that is RF inductively coupled to an integrated circuit including a gas plasma discharge device having an inductive coil, wherein emitting includes magnetically energizing the inductive coil with the integrated circuit to induce a discharge from the gas plasma. According to another aspect of the invention, a manufacture comprises: an integrated circuit including gas plasma discharge device having an inductive coil, wherein the inductive coil, can be magnetically energized by the integrated circuit to induce a discharge in a gas plasma that is RF inductively coupled to the integrated circuit.

According to another aspect of the invention, a process comprises: emitting an optical signal from an integrated circuit including a light source and an acousto-optic crystal optically coupled to the light source, wherein emitting includes diffracting the optical signal with the acousto-optic crystal. According to another aspect of the invention, a manufacture comprises: an integrated circuit including a light source and an acousto-optic crystal optically coupled to the light source, wherein the acousto-optic crystal diffracts an optical signal from the light source.

According to another aspect of the invention, a process comprises: emitting an optical signal from an integrated circuit including an acousto-optic crystal and a lens optically coupled to the acousto-optic modulator, wherein emitting includes diffracting the optical signal with the acousto-optic crystal. According to another aspect of the invention, a manufacture comprises: an integrated circuit including an acousto-optic crystal and a lens optically coupled to the acousto-optic crystal, wherein the acousto-optic crystal diffracts an optical signal and the lens diffracts the optical signal.

According to another aspect of the invention, a process comprises emitting an optical signal from a gas plasma that is capacitively coupled to an integrated circuit including a gas plasma discharge device having a first capacitive coupling plate and a second capacitive coupling plate, wherein emitting includes capacitively energizing at least one member selected from the group consisting of the first capacitive coupling plate and the second capacitive coupling plate with the integrated circuit to induce a discharge from the gas plasma. According to another aspect of the invention, a machine comprises an integrated circuit including gas plasma discharge device having a first capacitive coupling plate and a second capacitive coupling plate, wherein the first capacitive coupling plate and the second capacitive coupling plate can be capacitively energized by the integrated circuit to induce a discharge in a gas plasma that is capacitively coupled to the integrated circuit.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same elements. The invention may be better understood by reference to one or more of these drawings in combination with the description presented herein. It should be noted that the features illustrated in the drawings are not necessarily drawn to scale.

FIGS. 1A and 1B illustrate different views of an individual computer node including four optical signal sources, representing an embodiment of the invention.

FIGS. 4A and 4B illustrate top and side views of a gas filled hemisphere, representing an embodiment of the invention.

FIG. 5 illustrates a sectional view of an integrated source-modulator-lens, representing an embodiment of the invention.

FIGS. 6A and 6B illustrate schematic views of capacitively coupled gas discharge emitters in operation, representing embodiments of the invention.

DESCRIPTION OF PREFERRED EMBODIMENTS

Figure 2:
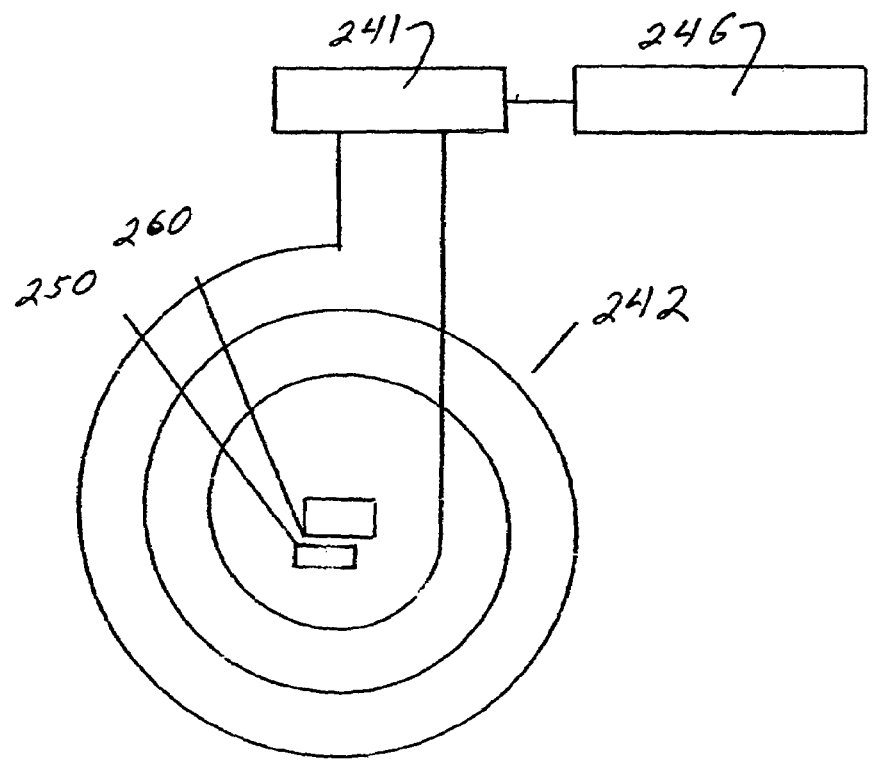
FIG. 2 illustrates a schematic view of a gas discharge emitter, representing an embodiment of the invention.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The below-referenced U.S. patent applications disclose embodiments that are useful for the purposes for which they are intended. The entire contents of U.S. Ser. No. 10/175,621, filed Jun. 20, 2002 and PCT/US03/19175, filed Jun. 18, 2003 both by Brian T. Donovan & William B. Dress and entitled "Pulse Width and/or Position Modulation and/or Demodulation" are both hereby expressly incorporated by reference for all purposes.

Overview

Referring to FIGS. 1A and 1B, the invention can include an integrated circuit embodied in a computer node 110, where the integrated circuit includes one or more optical signal emitters. In this embodiment, the computer node 110 includes i) a wafer carrying a plurality of microprocessors and ii) four optical signal emitters. The invention does not require the presence of the microprocessors and can include the use of any number of optical signal emitters. The optical signal emitters can be plasma gas discharge emitters 120 or laser and/or photo diodes 122. For instance, modulated VCSELs (vertical-cavity, surface-emitting lasers) can provide an alternative to the plasma gas discharge optical signal emitters.

Referring to the top of FIG. 1A, an adjacent computer node 123 is schematically depicted. Communication between nodes/wafers can be provided by readily commercially available fiber-optics modules which may be integrated onto each node/wafer. The nodes can be spaced from approximately 25 um to approximately 5000 um (preferably from approximately 250 um to approximately 500 um) apart from one another.

Referring to FIG. 1B, a side view of the computer node 110 is depicted. The computer node can include an on chip lens array 121 (not depicted in FIG. 1A). An optical signal detector can be located beneath each of the members of the chip lens array 121. Each of the optical signal emitters can include an emitter lens and/or light pipe 124. The emitter lens and/or light pipes 124 of two or more emitters, together with those integrated circuit emitters, can be combined to define an optical backplane, with or without the balance of the computer node 110 components.

Gas Plasma Discharge Based Optical Signal Emitting Integrated Circuits.

Referring to FIG. 2, the invention can include an integrated circuit gas plasma discharge optical signal emitter utilizing RF inductively coupled nitrogen, H, He, argon or other gas plasmas. The integrated circuit gas plasma discharge optical signal emitter includes an inductive coil 242. This embodiment of the integrated circuit gas plasma discharge optical signal emitter includes a power amplifier or oscillator 241 coupled to the inductive coil 242. Driving the coil differentially can double the voltage which is likely to improve performance. This embodiment of the integrated circuit gas plasma discharge optical signal emitter also includes a communications signal generator 246 coupled to the power amplifier or oscillator 241. Optionally, the integrated circuit gas plasma discharge optical signal emitter can include a tunneling spark circuit 250. Optionally, the integrated circuit gas plasma discharge optical signal emitter can include a heated electron emitter supply circuit 260.

Simple extrapolation from PCB scale 5 mm-15 mm coils indicate the following parameters for an exemplary 0.1 mm coil: 40 torr, 1-3 turns, 10 pH, 8 gauss, 22 GHz, 100 uW starting power. The 22 GHz is not a requirement. The 40 torr and the 22 GHz scale linearly. There is about 40:1 dynamic power range from simmer minimum to maximum power. Coil and coil drive parameters can be as follows: 20 mA 1 turn, 100 ps rise time given 260 Volts or 26 volts/ns rise time EMF induced in gas. For discharges above 10 MHz a few cm in length, the breakdown is about 30 V/cm. If the scaling holds, this is only 0.3V/100 um. The inductive field should be proportional to the dB/dT, which is proportional to the coil dI/dT. Newer semiconductor processes benefit from very fast edges. Thus, an important commercial advantage of the invention is that it can have a very fast edge time.

The emitters can include spiral coils covered with a thin layer of SiO2 in the normal or RF enhanced CMOS or BiCMOS processes. A void can be defined by etching away at least a portion of a substrate around and under the coil to improve the coil's performance by allowing the gas to come closer to the area of peak magnetic flux. The void can be fabricated using readily commercially available MEMS processing techniques.

The invention can include keeping the plasma "simmering" with a low level RF bias to improve and stabilize switch-on time. The plasma emitters can be kept simmering just above threshold by a digital pulse stream or dedicated oscillator.

Figure 3:
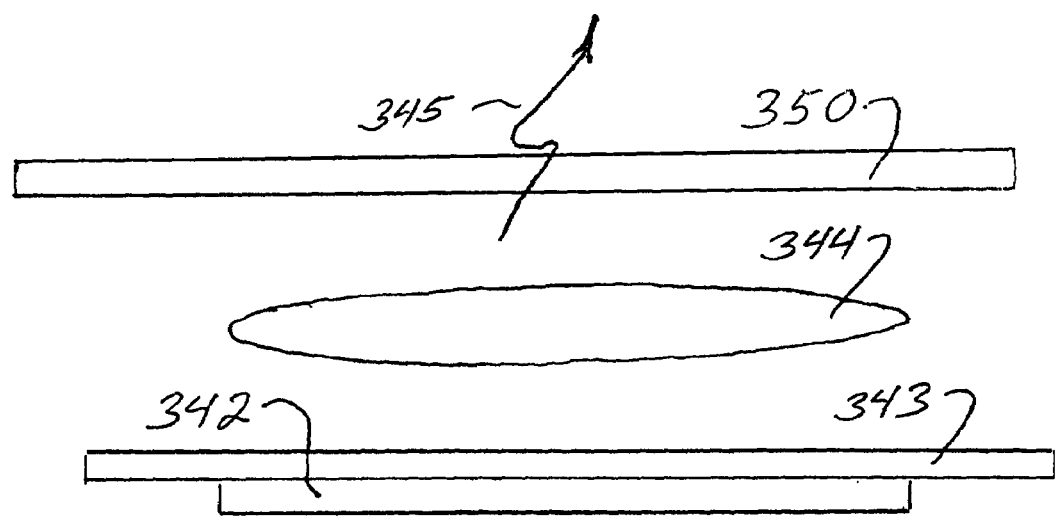
FIG. 3 illustrates a schematic side view of a gas discharge emitter in operation, representing an embodiment of the invention.

FIG. 3 depicts the emission of an optical signal 345 from an induced gas discharge 344 that is magnetically coupled to an inductive coil 342 of an integrated circuit gas plasma discharge optical signal emitter. The integrated circuit gas plasma discharge optical signal emitter can include an insulating overcoat 343 located between the inductive coil 342 and the induced gas discharge 344. The gas plasma (discharge) can be located between the integrated circuit and an optically and electrically conductive layer 350.

Calculations indicate about 1E16 electrons per meter^2 (about 10 k electrons/0.1 mm cube). The recombination rate is about 100 k electrons per ns at about 10 torr. If every recombination produces a photon, then under these conditions there would be 100 k photons. Conveying 1/1000th of these to each of the other node receivers, or about 100 photons, would be more than sufficient.

For silicon optical communication links, one promising wavelength compromise between gas emission efficiency and detector sensitivity is about 350 nm. This wavelength also allows the use of standard low cost fused silica or BK7 glass. The photons are absorbed in 0.7 um at 350 nm. Quantum efficiencies of over 50% at 350 nm are available in standard CMOS.

The invention can include assisting ignition of the discharge by illuminating the emitters with UV light. Illuminating the emitters with UV light can lower the ionization potential of the gas.

The invention can include the use of a bias applied to a clear conductive layer above the emitter (e.g., wafer). The clear conductive layer can include a pointed electron emission source. The pointed electron emission source can be heated to facilitate ignition.

The invention can include tailoring the composition of the gas and controlling the pressure to achieve a desirable "relaxation time." The relaxation time as used herein is defined as the time that is required for the plasma to stop emitting. The plasma starts emitting quickly enough.

In one embodiment of the invention, the entire space around the computer node (e.g., between the wafer and a mirror) can be evacuated to a partial pressure and back-filled with a suitable plasma forming gas (argon, helium, hydrogen, nitrogen, etc as required by the desired spectral, intensity, and density parameters). In an alternative embodiment, the invention can include filling microspheres of from approximately 1 mm to approximately 3 mm in diameter with an appropriate gas. The sphere could then be squashed (under temperature and slight pressure) to form a hemisphere which could then be mounted onto the wafer using pick-and-place techniques.

Referring to FIGS. 4A and 4B, top and sides views of a gas-filed hemisphere plasma light source 400 are depicted, respectively. The light source 400 includes a glass wall 410 and is filled with a gas. The glass wall 410 can include a flat side 415 for bonding to a wafer, chip or board. The light source 400 can include an optional converging element 420 on the outer side of the glass wall 410. The light source can include an optional converging element 430 on the inner side of the glass wall 410.

The invention can include an integrated circuit gas plasma discharge optical signal emitter utilizing RF capacitive coupled nitrogen, H, He, argon or other gas plasmas. Capacitive coupling can be used in combination with the inductive coupling described above or as an alternative to inductive coupling.

Referring to FIGS. 6A and 6B, two different capacitive coupling plasma generator apparatus configurations are depicted. Both of these configurations utilize two electrically conductive plates to which high voltage (HV) or radio frequency (RF) power can be applied. FIG. 6A depicts a serial plate arrangement where a first plate 610 is substantially parallel to, but not coplanar with, a second plate 620. A capacitive coupled plasma 625 is shown located between the first plate 610 and the second plate 620. One or both of the plates can include a clear (transparent, translucent and/or transmissive) material, thereby allowing an optical signal from the plasma to propagate through the clear material. FIG. 6B depicts a parallel plate arrangement where another first plate 630 is substantially parallel to, and substantially coplanar with, another second page 640. Another capacitive coupled plasma 635 is shown located above and between the another first plate 630 and the another second plate 640. Capacitive coupling is an alternative to (although capacitive coupling can be combined with) the coil based emitter depicted in FIG. 2.

Capacitive coupled plasma emitters can use RF energy that is independent of an electrode electron source. That is the electron production is entirely within the gas. Thus, the electrodes can be coated with a dielectric to minimize corrosion and contamination. A high dielectric constant material is preferable as the coating material because it will transmit more power for the same thickness. The RF energy can be coaxially transmitted straight up and through the gas, between two planer electrodes, or between a clear cover electrode and a substrate electrode. The capacitive coupled plasma approach is useful alternative for starting, simmering or modulating the plasma and can be used simultaneously with magnetic coupling.

Capacitive coupled plasma is particularly useful for modulating the plasma because of the lack of an inductive component, allowing higher frequencies. As with other activation modes, a higher starting voltage is needed compared to the voltage required to maintain the plasma.

The invention can include the use of multiple emitters in parallel. The use of parallel emitters can provide more emitted signal power and/or higher overall data throughput. For instance two emitters can be operated in an alternating sequence.

The invention can include the use of optical filters. It is important to note that many RF inductively couple-able gases emit multiple colors. In combination with such multiple color emissions, the use of filters can define and provide multiple channels.

The plasma-emitter concept can greatly reduce system cost compared to previous approaches while allowing high-speed modulation of the light beams at high efficiencies using the technologies described in U.S. Ser. No. 10/175,621, filed Jun. 20, 2002 and PCT/US03/19175, filed Jun. 18, 2003 both by Brian T. Donovan & William B. Dress and entitled "Pulse Width and/or Position Modulation and/or Demodulation."

Acousto-Optic Crystal Based Optical Signal Emitting Integrated Circuits

In an alternative embodiment, the optical signal emitter can be based on an acousto-optic crystal. The invention can include mounting (e.g., approximately 1 mm) an acousto-optical crystal above each light source (e.g., laser, diode, or plasma), optionally just below or integral with a collimating lens. Thus, high-speed modulation with multiple bits per symbol becomes possible, allowing information to be sent from each node at multiple gigabits per second.

The acousto-optic crystal can be embodied as a acousto-optic deflector and/or an acousto-optic modulator. In either event, an optical signal input side of the acousto-optic crystal can be coupled to the integrated circuit. Further, the invention can include a light emitting diode or a laser diode coupled between the optical signal input side of the acousto-optic crystal and the integrated circuit. In another alternative embodiment, the invention can include a lens coupled to an optical signal output side of the acousto-optic crystal. An important advantage of all of these alternative embodiments of the invention is that the use of the acousto-optic modulator enables quicker switching compared to typical LED or laser switch times. In this way, higher spectral efficiency for the communications and lower cost for the light emitter is possible. In yet another alternative embodiment of the invention, the acousto-optic crystal can be used in conjunction with the above described integrated circuit gas plasma discharge emitter.

In more detail, an acousto-optic crystal can be used to change the direction of light. An acoustic drive signal can be applied to the crystal creating regions of different density when the sound travels through the crystal. The acoustic drive signal can be provided by a voltage drive signal applied to a piezo electric crystal that is physically connected to the acousto-optic crystal. When a piezoelectric transducer is bonded to an acousto-optic (A-O) crystal, it will generate an acoustic traveling wave or standing wave in the medium. The elasto-optic interaction can then set up a periodic variation in refractive index characterized by an acoustic angular frequency and a wave vector. If the different density regions are periodically spaced, the acousto-optic crystal can then act as a grating for the incoming light, thereby diffracting the light as it is transmitted through the acousto-optic crystal. The incident optical wave can then be diffracted. However, only a fraction of the incident optical and acoustic beams will be effective in the diffraction process. The diffraction efficiency of the process is a function of the product of the acoustic power and a figure of merit which in-turn is a function of the applicable crystal material's photoelastic coefficient and density. The angle of the diffracted light depends on the wavelength of the density variations, which in-turn depends on the acoustic drive signal frequency. By changing the frequency applied to the piezo electric crystal, the wavelength of the standing acoustic wave in the crystal can be controlled, thereby controlling the diffraction angle. This approach can be used for acousto-optic deflection and/or acousto-optic modulation of the emitting light source. Acousto-optic deflecting can be embodiment with an acousto-optic crystal where a frequency ramp is applied to create a varying deflection angle of the diffracted light. Acousto-optic modulating can be embodied with an acousto-optic crystal where the light passing through the crystal is diffracted or transmitted depending on the acoustic drive signal. When the fixed frequency drive signal is turned on, the light is diffracted and when the signal is off, the light passes through the crystal without diffraction. The amount of light diffracted depends on the amplitude of the drive signal. The diffracted light can continue along the optical path while the transmitted light is blocked. Alternatively, the transmitted light can continue along the optical path while the diffracted light is blocked. Suitable acousto-optic crystals include indium-phosphide, lithium niobate ($LiNbO_3$), bismuth germanium oxide (BGO) and the sheelite group crystals: $CaWO_4$, $CaMoO_4$, $PbMoO_4$, and $PbWO_4$.

Referring to FIG. 5, an embodiment of the invention integrating an acousto-optic crystal as an acousto-optic modulator, with light emitting or laser diode, and a lens is depicted. The integrated acousto-optic crystal assembly can be from approximately 1 mm to approximately 3 mm in diameter. As noted above, the previously described integrated circuit gas discharge device can be substituted for the LED/laser diode subassembly depicted in FIG. 5.

Referring to FIG. 5, an integrated light emitting diode, modulator, lens light source 500 includes an LED or laser diode 510. The LED or laser diode 510 is optically coupled to an optical-modulator 520 that includes an acousto-optic crystal. The optical modulator 520 is optically coupled to a lens 530. The lens can include an option converging element 535. A pair of modulator leads 540, 550 are electrically coupled to the optical modulator 520.

Still referring to FIG. 5, in a preferred embodiment, an indium-phosphide or other suitable acousto-optic crystal is mounted onto a light-emitting diode (LED) with acousto modulation leads extending through the LED to the base of the package which is then mounted onto a wafer using pick-and-place techniques. In this embodiment, a lens is mounted onto the opposite side of the acousto-optic crystal. In this way, an LED/Modulator integrated package complete with optics is possible.

The integrated acousto-optic crystal concept can greatly reduce system cost compared to previous approaches while allowing high-speed modulation of the light beams at high efficiencies using the technologies described in U.S. Ser. No. 10/175,621, filed Jun. 20, 2002 and PCT/US03/19175, filed Jun. 18, 2003 both by Brian T. Donovan & William B. Dress and entitled "Pulse Width and/or Position Modulation and/or Demodulation."

Optical Signal Emitting Integrated Circuit Testing

While not being limited to any particular performance indicator or diagnostic identifier, preferred embodiments of the emitter device can be identified one at a time by testing for the presence of stable and repeatable electrical performance. The test for the presence of stable and repeatable electrical performance can be carried out without undue experimentation by the use of a simple and conventional probe experiment. For instance, if the current, voltage and frequency characteristics of an emitter coil pass normal probe testing, then the induced field will be correct for a gas discharge emitter device that includes that emitter coil. Among the other ways in which to seek preferred embodiments of the emitter device is based on the presence of stable and repeatable optical performance. Many companies including Agilent make readily commercially available optical testing heads, thereby enabling optical testing of the emitter devices.

Modulation and Demodulation

The light beams, established by plasma, laser, or LED, must be modulated to pass information between nodes. Both the plasma source and laser embodiments may be amplitude and/or pulse-width/pulse-position modulated. While a light-emitting diode may be modulated in the hundred-megahertz region, this is insufficient for the higher-performance systems envisioned unless the optical signal from the LED is modulated by an acousto-optic crystal.

The simplest form of optical modulation is pulse-amplitude modulation (PAM) where the light is either present or absent. PAM is a form of "Morse Code" using presence or absence of light (or, more generally high intensity and low intensity pulses) instead of dots and dashes. PAM has a maximum special efficiency of 1 bit/Hertz. Thus, on-off pulses at a rate of 1 GHz can transmit the information at a rate of 1 Gbit/second. Higher spectral efficiencies are possible using more sophisticated modulation techniques.

An additive pulse stream at higher frequency and amplitude provides the modulation necessary for encoding information on the emitted light. VCSELs (vertical-cavity, surface-emitting lasers) can be electrically modulated at rates sufficient for high-speed communications. As mentioned above, solid-state modulators may be mounted above each laser, LED, or plasma source, providing an alternate method of modulation, one that will allow higher spectral efficiencies.

The digital pulses can be created and controlled by the technologies described in U.S. Ser. No. 10/175,621, filed Jun. 20, 2002 and PCT/US03/19175, filed Jun. 18, 2003 both by Brian T. Donovan & William B. Dress and entitled "Pulse Width and/or Position Modulation and/or Demodulation" which include an analog-to-digital-to-analog concept that enables precise pulse-width modulation and measurement in an all-CMOS process. Precise control over pulse width allows encoding light beams at an efficiency much greater than 1 bit/Hertz. The inverse process allows a receiver to decode a stream of transmitted pulses widths and heights by measuring the widths and heights to the required precision.

Practical Applications of the Invention

Practical applications for integrated circuit gas discharge embodiment of the invention include: transient spike suppressor; integrated gas laser; sound generation and'sensing; high voltage, high current switches, for a radar transmitter receiver switch for instance; radio frequency antenna array; integrated plasma display unit; vacuum window, pump and valves, electron and ion sources, gas diode, thyratron, electron multiplying gas filled photocell; Geiger counter; plasma torch; gas analysis; chemical catalyst; magnetic sensor, isotope separator, thin film deposition. An integrated circuit gas discharge device is useful in a nonequilibrium (low-pressure) mode or a thermal (high-pressure) mode for surface processing including ion implantation, hardening, welding, cutting and/or drilling. An integrated circuit gas discharge device is useful in a nonequilibrium (low-pressure) mode or a thermal (high-pressure) mode for volume processing, for instance: flue gas treatment, metal recovery and/or waste treatment. An integrated circuit gas discharge device is useful for chemical synthesis, for example: plasma spraying, diamond film deposition and the manufacture of ceramic powders. An integrated circuit gas discharge device is useful for switches, for example electric power switches and/or pulsed power switches. An integrated circuit gas discharge device is useful for energy converters, for example MHD generators and/or thermionic energy converters. An integrated circuit gas discharge device is useful for lasers. An integrated circuit gas discharge device is useful for flat-panel displays, for instance, field-emitter arrays and/or plasma displays. An integrated circuit gas discharge device is useful as a light source, for high intensity discharge lamps, for low pressure lamps and/or for specialty light sources. An integrated circuit gas discharge device is useful for radiation processing, such as water purification and/or enhanced plant growth. An integrated circuit gas discharge device is useful for medical applications such as surface treatment and/or instrument sterilization. An integrated circuit gas discharge device is useful in conjunction with beam sources. An integrated circuit gas discharge device is useful for isotope separation. An integrated circuit gas discharge device is useful for propulsion. An integrated circuit gas discharge device is useful for material analysis. There are virtually innumerable uses for the invention, all of which need not be detailed here.

The terms a or an, as used herein, are defined as one or more than one. The term plurality, as used herein, is defined as two or more than two. The term another, as used herein, is defined as at least a second or more. The terms comprising (comprises), including (includes) and/or having (has), as used herein, are defined as open language (i.e., requiring what is thereafter recited, but open for the inclusion of unspecified procedure(s), structure(s) and/or ingredient(s) even in major amounts. The phrases consisting of and/or composed of close the recited method, apparatus or composition to the inclusion of procedures, structure(s) and/or ingredient(s) other than those recited except for ancillaries, adjuncts and/or impurities ordinarily associated therewith. The recital of "essentially" along with "consisting of" or "composed of" renders the recited method, apparatus and/or composition open only for the inclusion of unspecified procedure(s), structure(s) and/or ingredient(s) which do not materially affect the basic novel characteristics of the composition. The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer or computer system.

All the disclosed embodiments of the invention disclosed herein can be made and used without undue experimentation in light of the disclosure. The invention is not limited by theoretical statements recited herein. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

All the disclosed elements and features of each disclosed embodiment can be combined with, or substituted for, the disclosed elements and features of every other disclosed embodiment except where such elements or features are mutually exclusive. Variation may be, made in the steps or in the sequence of steps composing methods described herein.

Although the integrated circuit gas discharge device described herein can be a separate module, it will be manifest that the integrated circuit gas discharge device may be amalgamated into the system with which it is associated. For instance, the integrated circuit gas discharge device may be part of an optical backplane. Similarly, the integrated acousto-optic modulator with light source and/or lens may be a separate module or may be amalgamated into the system with which it is associated.

The individual components need not be formed in the disclosed shapes, or combined in the disclosed configurations, but could be provided in virtually any shapes, and/or combined in virtually all configurations. The individual components need not be fabricated from the disclosed materials, but could be fabricated from virtually any suitable materials.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising
emitting an optical signal from a gas plasma that is RF inductively coupled to an integrated circuit including a gas plasma discharge device having an inductive coil; and
igniting the discharge with an electron emitter that is coupled to an optically and electrically conductive layer,
wherein the gas plasma is located between the integrated circuit and the optically and electrically conductive layer,
wherein emitting includes magnetically energizing the inductive coil with the integrated circuit to induce a discharge from the gas plasma.

2. The method of claim 1, wherein the integrated circuit includes an oscillator and magnetically energizing the inductive coil includes magnetically energizing the inductive coil with the oscillator.

3. The method of claim 1, further comprising capacitively energizing at least one member selected from the group consisting of a first capacitive coupling plate and a second capacitive coupling plate with the integrated circuit to facilitate the discharge from the gas plasma.

4. The method of claim 1, wherein magnetically energizing the inductive coil includes the use of a differential drive to increase power.

5. The method of claim 1, further comprising illuminating the integrated circuit with actinic radiation to lower an ionization potential of the gas plasma.

6. The method of claim 1, further comprising applying an RF bias to the gas plasma and maintaining the RF bias to affect switch-on time of the gas plasma.

7. The method of claim 1, further comprising refracting the optical signal with an optically conductive layer that is optically coupled to the gas plasma.

8. The method of claim 1, further comprising diffracting the optical signal with an acousto-optic crystal that is optically coupled to the gas plasma.

* * * * *